Oct. 17, 1939.   G. C. HINES   2,176,798
RAFTER SQUARE
Filed May 24, 1938   2 Sheets-Sheet 1

Glen C. Hines
INVENTOR

BY Victor J. Evans & Co.
ATTORNEYS

Oct. 17, 1939.　　　　G. C. HINES　　　　2,176,798
RAFTER SQUARE
Filed May 24, 1938　　　2 Sheets-Sheet 2
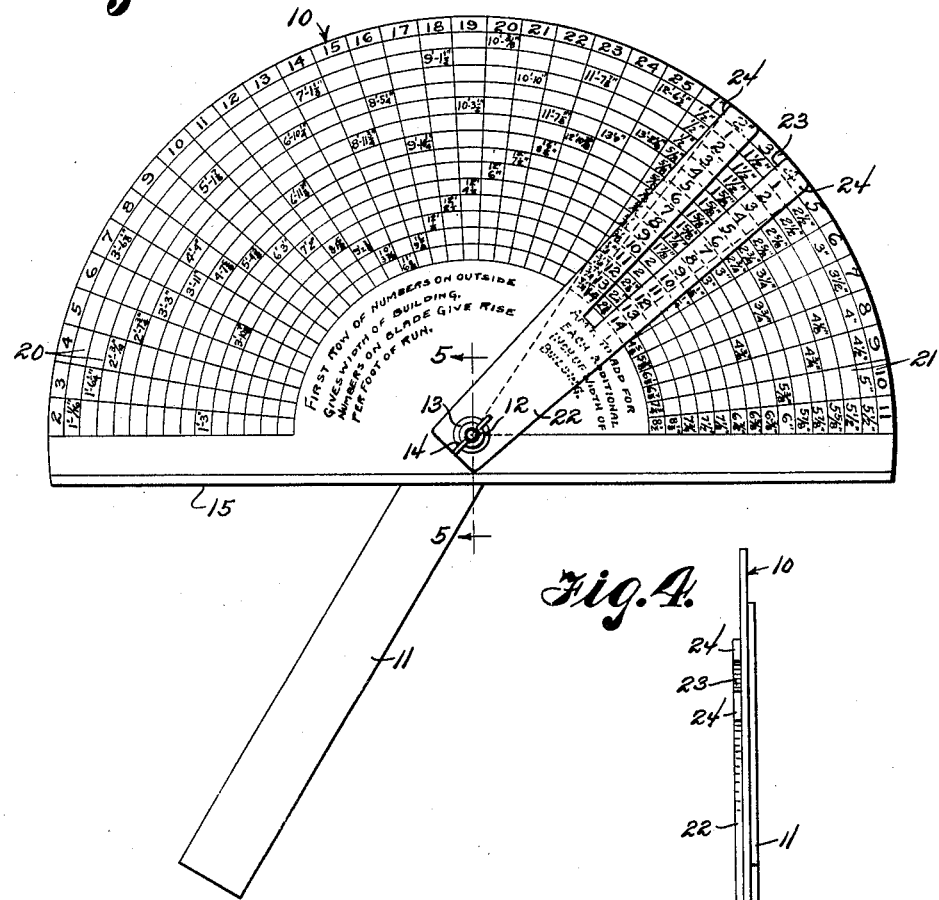
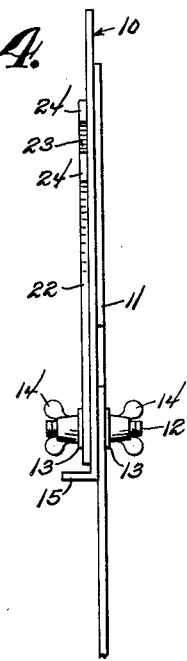
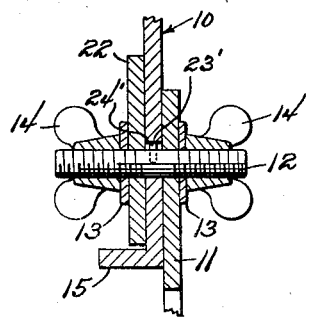
Glen C. Hines INVENTOR
BY Victor J. Evans & Co.
ATTORNEYS Patented Oct. 17, 1939

2,176,798

UNITED STATES PATENT OFFICE 2,176,798

RAFTER SQUARE

Glen C. Hines, Raymondville, Tex.

Application May 24, 1938, Serial No. 209,790

2 Claims. (Cl. 33—75)

This invention relates to rafter squares and has for an object to provide a measuring instrument of this character which will embody concentric scales and a bifurcated arm swingable over the scales to enable the length of common rafters for buildings of different widths, to be readily computed by those unable to use conventional rafter scales because of the complexity of such scales.

A further object is to provide a device of this character which will have only one edge to place against the timber for marking the timber preparatory to making a cut, thus promoting ease of reading and minimizing the danger of making a mistake.

A further object is to provide a rafter square having concentric scales and a single blade movable thereover to permit the bevel cut of rafters to be easily and quickly determined.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 3 is a rear elevation of the rafter square showing the concentric scales and bifurcated arm for computing the length of rafters for various widths of buildings.

Figure 4 is an edge elevation of the rafter square.

Figure 5 is a cross sectional view taken on the line 5—5 of Figure 3.

Figure 1:
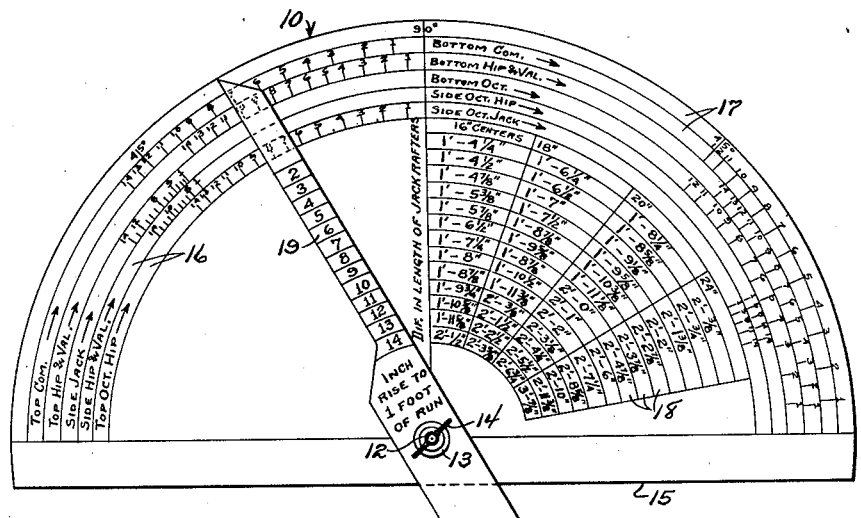
Figure 1 is a front elevation of a rafter square constructed in accordance with the invention and showing the blade and concentric scale for computing the bevel cut for different rafters.
Figure 2:
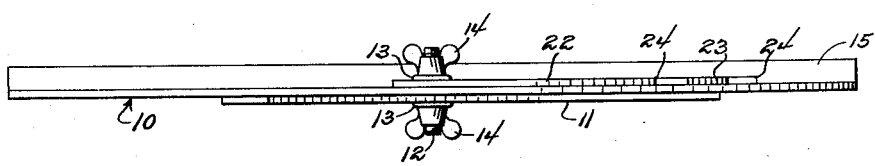
Figure 2 is a plan view of the rafter square shown in Figure 1.

Referring now to the drawings in which like characters of reference designate similar parts in the various views, 10 designates a semi-circular plate. A blade 11 is pivotally connected to the plate through the medium of a screw bolt 12 having washers 13 and nuts 14 on the opposite threaded ends thereof, as best shown in Figure 5. The blade projects entirely across the face of the plate and it is extended a considerable distance beyond the straight edge 15 of the plate to provide a straight edge for the purpose of marking off the angles or bevels for the cuts of the rafters.

On the face of the plate, concentric with the pivot bolt 12 is a plurality of arcuate scales 16. These scales extend through an arc of 90 degrees on one side of the center diameter of the plate and display graduations indicating cuts for respectively top common, top hip and valley, side jack, side hip and valley, and top octagon hip rafters.

Arcuate scales 17 are displayed on the face of the plate on opposite sides of the center diameter and display graduations indicating cuts for bottom common, bottom hip and valley, bottom octagon, side octagon hip and side octagon jack rafters.

Disposed also on the face of the plate is a plurality of arcuate scales 18 which display graduations indicating linear measurements of differences in length of jack rafters through a range of 16, 18, 20 and 24 inches between centers. A scale 19 is marked on the blade to cooperate with the scales 18 and the blade scale graduations indicate inch rise to one foot of run.

As best shown in Figure 5 the reverse side of the plate 10 is provided with arcuate concentric scales 20 which extend throughout about an arc of 120 degrees. The outermost scale is marked with graduations to indicate different widths of buildings consecutively from two feet to twenty-five feet. The scales subtended by the outer scale display graduations denoting the length of respective rafters corresponding to the different widths of buildings, in feet.

Also displayed on the reverse face of the plate 10 is a plurality of arcuate concentric scales 21 extending throughout an arc of 60 degrees. The outermost scale of this series of scales is marked with graduations indicating inches from one inch to eleven. This scale permits inches to be added to the foot widths of buildings, that is, a building may be 20′ and 6″ wide and thus the reading on the 20 or the 21 foot widths would be inaccurate for cutting the proper length of rafter. Therefore the scales subtended by the scales 21 are graduated to respectively indicate inches in length to be added to the numeral indicating the length of the rafter on any foot width of building, as will be presently described.

An arm 22 is pivotally mounted on the pivot bolt 12 and extends over the rear face of the plate 10 to aid in computing lengths of rafters for buildings of various widths. The scale is provided in the free end with a bifurcation 23 which constitutes a sight opening for exposing the numerals of the scales 20 and 21 as the arm is swung to its limit of movement in either direction against the straight edge 15 of the plate. The fingers 24 of the arms, on each side of the bifurcation 23, display respective longitudinal scales beginning at one at the outer end of the finger and ending at fourteen at the inner end of the finger, these numerals indicating inch rise to one foot of run.

To use the arm 22, assuming that the building is 21' and 8" wide. The arm would be swung to the left of the position shown in Figure 3 until the numeral 20 appeared in the bifurcation and then knowing the inch rise per foot of run, say 8", the numeral in the bifurcation opposite the numeral 8 will be read as 12' 7½". The scale is now swung in a retrograde direction until the numeral 8 denoting added inches to the width of the building appears in the bifurcation and then the numeral opposite 8 on the finger of the arm is read through the bifurcation and is found to be 4¾ or 13' ¼".

For preventing the pivot bolt 12 rotating relatively to the plate 10 the pivot bolt is provided with a radially extending stop pin 23' which projects into a radially disposed slot 24' formed at the center of the pivot bolt opening in the plate. The pivot bolt will thus be held against rotation when either of the nuts 14 are screwed tight or unscrewed to permit manipulation of the blade 11 or the arm 22.

From the above description it is thought that the construction and operation of the invention will be fully understood without further explanation.

What is claimed is:

1. A rafter square comprising a semi-circular plate having a straight edge, radially disposed arms on opposite sides of the plate, one of the arms being extended beyond said straight edge to form a blade, a pivot bolt projecting through said plate and fixed to the plate at the center of said straight edge, said arms being loosely mounted on said bolt, and nuts on the ends of the bolt engageable with respective ones of said arms to lock the arms in adjusted positions on the plate, one side of the plate being provided with concentric scales, one of said arms being provided with a longitudinal scale, and the arm having the longitudinal scale being bifurcated at the free end to provide a sight opening through which the scales on the respective side of the plate may be read.

2. A rafter square comprising a semi-circular plate having a straight edge, radially disposed arms on opposite sides of the plate, one of the arms being extended beyond said straight edge to form a blade, a pivot bolt projecting through said plate, a radially extending stop pin on the bolt projecting into a radially disposed slot formed in the wall of the pivot bolt opening in the plate for preventing the pivot bolt rotating relatively to the plate, said arms being loosely mounted on said bolt, and nuts on the ends of the bolt engageable with respective ones of said arms to lock the arms in adjusted position on the plate, one side of the plate being provided with concentric scales, one of said arms being provided with a longitudinal scale and the arm having the longitudinal scale being bifurcated at the free end to provide a sight opening through which the scales on the respective side of the plate may be read.

GLEN C. HINES.